(12) United States Patent
Ziebell

(10) Patent No.: US 6,663,967 B1
(45) Date of Patent: Dec. 16, 2003

(54) MOLDABLE SILICONE ELASTOMERS HAVING SELECTIVE PRIMERLESS ADHESION

(75) Inventor: Rick A. Ziebell, La Habra, CA (US)

(73) Assignee: Bryant Rubber Corporation, Harbor City, CA (US)

( * ) Notice: Subject to any disclaimer, the term of this patent is extended or adjusted under 35 U.S.C. 154(b) by 0 days.

(21) Appl. No.: 09/715,963

(22) Filed: Nov. 17, 2000

(51) Int. Cl.[7] .............................. B32B 27/38; B32B 9/04
(52) U.S. Cl. ................... 428/413; 428/447; 524/266; 524/268; 528/15; 528/31; 528/32; 528/34
(58) Field of Search ................. 528/15, 31, 32, 528/34; 524/266, 268; 428/413, 447

(56) References Cited

U.S. PATENT DOCUMENTS

| | | | |
|---|---|---|---|
| 4,087,585 A | 5/1978 | Schulz | 428/429 |
| 5,164,461 A | 11/1992 | Mitchell et al. | 525/478 |
| 5,270,425 A * | 12/1993 | Vanwert et al. | 528/15 |
| 5,585,445 A | 12/1996 | Meguriya et al. | 525/476 |
| 5,595,826 A | 1/1997 | Gray et al. | 428/450 |
| 5,792,812 A | 8/1998 | Fujiki et al. | 525/105 |
| 5,879,809 A * | 3/1999 | Muramatsu et al. | 428/412 |
| 6,040,366 A * | 3/2000 | Burkus et al. | 524/99 |
| 6,127,503 A | 10/2000 | Fujioka et al. | 528/15 |
| 6,448,329 B1 * | 9/2002 | Hirschi et al. | 524/588 |

FOREIGN PATENT DOCUMENTS

| | | | |
|---|---|---|---|
| EP | 0757080 A2 | 7/1996 | |
| EP | 0878285 A1 | 7/1997 | 45/16 |

* cited by examiner

*Primary Examiner*—Robert Dawson
*Assistant Examiner*—Marc S. Zimmer
(74) *Attorney, Agent, or Firm*—Jeffer, Mangels, Butler & Marmaro LLP

(57) ABSTRACT

Organopolysiloxane compositions that cure by the addition reaction of silicon-bonded lower alkenyl radicals with silicon-bonded hydrogen atoms and which exhibit select adhesion to a variety of substrates. The compositions comprise an adhesion promoting mixture comprising an epoxy-functional compound, soluble polydiorganosiloxanes and polycycloorganosiloxanes (linear and cyclic) thus giving release characteristics to metal substrates while maintaining adhesion to the thermoplastic substrate. Additionally, an additive may be used to produce surface lubricity after curing.

9 Claims, No Drawings

MOLDABLE SILICONE ELASTOMERS HAVING SELECTIVE PRIMERLESS ADHESION

FIELD OF THE INVENTION

The present invention relates both to a method for improving the primeness adhesion of cured silicone elastomers and to curable (and cured) high strength, organopolysiloxane molding compositions useful to produce cured silicone rubber articles that exhibit excellent adhesion to thermoplastic resins such as, but not limited to, PBT and PPA, while not significantly adhering to metal substrates.

BACKGROUND OF THE INVENTION

Moldable primeness organopolysiloxane compositions are known and commonly used. One problem with all such compositions is that due to the adhesion additives in the compositions they also adhere to metal surfaces. In molding processes, the typical mold is metal. It is difficult to selectively adhere to thermoplastic substrates without deleterious effects. Additionally, the kinetics and thermochemistry of the molding process and the compositions used in such processes are such that only small lightweight composite plastic and silicone elastomer articles of manufacture can be made by molding techniques because of the difficulty of removing the article from the metal mold.

Organopolysiloxane compositions useful for molding typically contain alkenyl polymers, fillers, and other additives. The compositions contain a platinum catalyst, a hydride crosslinker and cure inhibitors. These can be one or two component systems that are mixed prior to the molding process. These heat cured (i.e. high consistency or millable rubber) or liquid injection molded silicone rubbers are commonly available without additives that improve adhesion.

Typical molding compositions generally include the following ingredients:
1) 100 parts by weight of a vinyl stopped polydimethylsiloxane having a viscosity ranging from 10,000 to 1,000,000 centipoises at 25° C. and a vinyl content ranging from about 0.01 to 0.25 mole per cent;
2) up to 10 parts by weight of a low molecular weight vinyl stopped vinyl on chain polyorganosiloxane having a viscosity ranging from 100 to 10,000 centipoises at 25° C. and a vinyl content of 0.3 to 30 mole per cent;
3) up to 10 parts by weight of a low molecular weight hydroxy endblocked polyorganosiloxane having a viscosity ranging from 500 to 2,000 centipoises at 25° C.;
4) from 5 to 50 parts by weight of a fumed or pyrogenic silica having a surface area ranging from 150 to 450 square m/gm;
5) from 0.3 to 40 parts by weight of an organohydrogenpolysiloxane crosslinker containing at least two silicon-bonded hydrogens per molecule;
6) from 2 to 500 wppm of a platinum hydrosilylation catalyst;
7) from 0.01 to 3.0 parts by weight of an inhibitor compound; and
8) from 100 to 1,000 wppm of silyl hydrides.

Additional components may include extending fillers, coloring agents, and additives to impart increased performance with respect to certain physical properties such as oil resistance, heat aging, abrasion resistance and the like.

The functional properties of the resulting rubber elastomer depend not only on the levels of components but also on the properties of the filler, additives, and type of curing catalyst. Consequently, the elastomer property profile is highly dependent on the chemical nature of the various constituent components as well as the relative proportions of those components. For example, a heat additive increases the temperature range of the resulting rubber. Such improvements however, do not necessarily increase the adhesion stability and some times fail to adhere after heat soak.

In seeking to increase the selective adhesion of silicone compositions to thermoplastic and thermoset substrates, it is frequently desirable to increase the ability of the silicone to be released from a mating part or surface for which the molded composite may come in contact. These two properties collide in that adhesion of the silicone to a thermoplastic or thermoset substrate is desired but ready release from another substrate is necessary for the device to function. For example, the fabrication of connecters requires adhesion of the grommet and facial seal to a thermoplastic closure and also requires that the silicone surface have sufficient lubricity to allow mating sides to fasten and unfasten with ease.

A typical method of improving the lubricity of a silicone composition is simply to add a liquid component to the formulation that has limited solubility in the elastomer and thus the compound bleeds out over time. Ideally such a material itself also has a lubricating quality. These components are typically selected from the group of compounds consisting of phenyl containing siloxanes such as copolymers of polydimethylsiloxanes, diphenylsiloxane or methylphenylsiloxane, and fluorosiloxanes such as silicones containing trifluoropropyl substituted siloxanes.

SUMMARY OF THE PREFERRED EMBODIMENTS

Accomplishment of this selective adhesion is by the addition to a diorganopolysiloxane composition of soluble polydiorganosiloxanes and polycycloorganosiloxanes (linear and cyclic) of a specific molecular distribution preferably having viscosity of 10 to 1,000 centipoises at 25° C. and an epoxy functional compound thus giving release characteristics to metal substrates while maintaining adhesion to the thermoplastic substrate.

In general, the preferred embodiment of the present invention provides for a curable silicone elastomer composition comprising:
1) a silicone elastomer;
2) an epoxy functional compound; and
3) a linear and/or cyclic diorganopolysiloxane.

The foregoing composition may also include a silicone soluble in the curable elastomer composition. Preferably, the silicone is less soluble in the curable elastomer composition when the curable composition has been cured. As a result, the silicone bleeds out of cured composition to improve lubricity.

The present invention provides a composition that selectively adheres to a substrate that may be a thermoset or a thermoplastic, but not to a metal such as aluminum or steel. The thermoset or thermoplastic substrates may be filled polymers with glass or clays. The silicone compositions of the present invention release readily from metal substrates after they have been overmolded, transfer molded or injection molded. The present invention further provides for the incorporation of an adhesion promoter and a self-bleed additive that allows lubrication of the surfaces of the cured silicone simultaneously with adhesion to the overmolded, transfer molded or injection molded substrate. The formulations of the present invention demonstrate that compositions containing both an adhesion promoter and a self-bleed additive for lubricity can simultaneously achieve the contradictory goals of adhesion to a substrate used in overmolding, transfer or injection molding and release from a second substrate where the silicone was not bonded to the substrate by the action of the adhesion promoter and the co-molding process of overmolding, transfer molding or injection molding.

DETAILED DESCRIPTION OF THE PREFERRED EMBODIMENTS

This invention utilizes the release characteristics of soluble polydiorganosiloxanes and polycycloorganosiloxanes (linear and cyclic) of specific molecular distribution preferably having viscosity of 10 to 1,000 centipoises at 25° C. The two (2) additives that provide the selective adhesion properties are:

1) generally from 0.01 to 10, preferably from 0.05 to 1.0 and more preferably from 0.10 to 0.50, parts by weight of an epoxy function compound; and
2) generally from 0.01 to 10, preferably from 0.5 to 5 and more preferably from 1 to 3, parts by weight of soluble polydiorganosiloxanes and/or polycycloorganosiloxanes (linear and/or cyclic).

Optionally, a silicone soluble in the curable elastomer composition can be added. The silicone is selected such that it is less soluble in the curable elastomer composition when the curable composition has been cured. As a result, the silicone bleeds out of the cured composition.

In general, one preferred embodiment of the present invention comprises a curable organopolysiloxane composition having selective adhesion to a metal substrate. The composition should preferably include the following components:

(A) up to 100 parts by weight of an organopolysiloxane polymer having a viscosity of about 10,000 to about 100,000,000 centipoises at 25° C. with sufficient vinyl, or mixtures of such organopolysiloxane, to provide functional reactivity to the following crosslinker;

(B) from 0.3 to 40 parts by weight of an organohydrogenpolysiloxane crosslinker containing at least two silicon-bonded hydrogens per molecule;

(C) a catalytically effective amount of a platinum group metal catalyst;

(D) from 0.01 to 3 parts by weight of a cure inhibitor, preferably of the type 4 or 5, ethynyl cyclohexan-1-ol;

(E) from 0.01 to 30 parts by weight of an adhesion promoter compound having at least one hydroxy group and in the same molecule at least one substituent selected from the group consisting of silicon hydride, alkenyl, and acryl;

(F) from 0.01 to 10 parts by weight of an epoxy functional compound; and (G) up to about 10 parts by weight based upon the total composition of soluble polydiorganosiloxanes and polycycloorganosiloxanes (linear and cyclic) of a specific molecular distribution having a viscosity of 50 to 1,000 centipoises at 25° C.

Preferably, the organopolysiloxane polymer contains at least two silicon-bonded lower alkenyl groups in each molecule and is a straight chain organopolysiloxane having a viscosity of about 100,000 to about 100,000,000 centipoises at 25° C., or mixtures of such organopolysiloxanes, and the lower alkenyl groups are vinyl. Examples of organopolysiloxanes include Dow Corning Q42901 and Q42903 gums, with an average pendant vinyl content ranging from 0.01 to 0.20 mole percent with 0.80 to 0.20 mole percent being preferable.

Preferably, the organohydrogenpolysiloxane crosslinker has organic substituents bonded to silicon atoms, which are methyl, and the concentration of organohydrogenpolysiloxane provides about 0.2 to about 0.02 silicon-bonded hydrogen atoms for each silicon-bonded alkenyl radical in the organopolysiloxane polymer, and wherein the crosslinker has the formula:

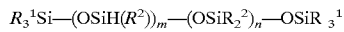

$R_3^1Si-(OSiH(R^2))_m-(OSiR_2^2)_n-OSiR_3^1$ wherein $R^1$ is independently chosen from a hydrogen or monovalent hydrocarbon radical free of aliphatic unsaturation containing 1 to about 8 carbon atoms, $R^2$ is independently chosen from a monovalent hydrocarbon radical free from aliphatic unsaturation containing 1 to about 4 carbon atoms, m is 1, 2, 3 . . . , n is 0, 1, 2 . . . , and m+n, and m+n varies so that the crosslinker has a viscosity ranging from about 80 to 1,000 centipoises at 25° C. Preferably each R is independently chosen from as a methyl, ethyl, vinyl, hydroxy, propyl, and 3,3,3-trifluoropropyl, and/or a branch chain of polydiorganosiloxane group and is itself a straight chain where x is given to create a viscosity of 10,000 to 10,000,000 centipoises at 25° C. These may contain mixtures of such polymers or block co-polymers of same to give vinyl functionality for cross-linking. They may also be blended to provide desired thermo-chemical reaction rates. Examples of cross linkers include Dow Corning 1107 and 63570 cross-linkers with Dow Corning silbond 7608 being preferable.

The platinum group metal catalyst is selected from the group consisting of platinum metal, platinum compounds, platinum complexes and mixtures thereof. Preferably, the platinum group metal catalyst is chloroplatinic acid complexed with a liquid olefin or an organosiloxane containing ethylenically unsaturated hydrocarbon radicals bonded to silicon. More preferably, the platinum group metal catalyst is a neutralized complex of chloroplatinic acid or platinum dichloride with divinyltetramethyldisiloxane.

In general, the platinum group metal catalyst provides about 0.1 to about 500 parts by weight platinum group metal per million parts of the combined weights of organopolysiloxane and organohydrogenpolysiloxane. Preferably, the platinum group metal catalyst provides about 1 to about 50 parts by weight platinum group metal per million parts of the combined weights of organopolysiloxane and organohydrogenpolysiloxane.

In general, the cure inhibitor compound is an acetylene alcohol derivative such as ethenylcyclohexanol or pyridine alcohol having the following general formula:

$R'R(OH)_x$

Where R' is an alkyne unsaturated hydrocarbon chain, branched or unbranched, and R is a saturated hydrocarbon linear or cyclic with hydroxy groups pendant or end blocked with hydroxy saturation indicated by x, which is 1 to complete hydroxy saturation of the R group.

In general, the adhesion promoter is a hydroxinated silicone compound of the formula:

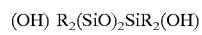

$(OH)R_2(SiO)_2SiR_2(OH)$

Where R is any hydrocarbon alkyl or alkenyl radical linear or branched comprising not more than 10 carbon atoms, R' is any mixture of any alkyl, alkenyl, aliphatic, or aromatic radical, linear or branched, up to 12 carbon atoms, and where z is of sufficient number to create a viscosity of about 50 to about 10,000 centipoises at 25° C. In general from 0.01 to 30, preferably from 0.05 to 2, and more preferably from 0.5 to 1, parts per weight are used. Examples include 1-hydroxy 2,3 methyl endblocked vinylmethylsiloxane (DP 10 to 12 with 2 to 4 pendant vinyl groups).

In general, the epoxy-functional compound is of the formula:

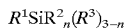

$$R^1SiR^2{}_n(R^3)_{3-n}$$

where n is 0 or 1, $R^1$ is an epoxyalkyl or alkenyl radical, $R^2$ is an alkyl radical, and $R^3$ is an alkoxy, carboxy or ketoximo radical. Preferably, $R^1$ is a glycidoxy, $R^2$ is a propyl, and $R^3$ is a methoxy or ethoxy group. The glycidoxypropyltrimethoxysilane may include methacrylvinylpolysilane, chlorotrimethoxysilane, vinyltrimethoxysilane, and divinyldimethoxysilane. In generally from 0.01 to 30, preferably from 0.05 to 1.0 and more preferably from 0.10 to 0.50, parts by weight are used.

The polydiorganosiloxanes include Dow Corning 200 fluid. Viscosity grades 50 to 200 are preferable and grades 50 to 10,000 in general. An example of polycycloorganosiloxanes includes Dow Corning 244 fluid and other cyclic siloxanes from D4 to D10 (DP units), preferably D 4 and D5. The molecular distribution should be such as to produce a viscosity at 25° C. of 50 to 1,000 preferably 50 to 200 centipoises, and more preferably 50 to 100 centipoises.

In another embodiment of the present invention, the epoxy-functional compound is glycidoxypropyltrimethoxysilane. Preferably, the epoxy-functional compound comprises about 0.01 to 10 parts by weight per 100 weight parts of organopolysiloxane polymer.

The composition according to the present invention can include a filler selected from the group consisting of fumed silica, treated fumed silica, precipitated silica, treated precipitated silica, fused silica, and finely divided quartz and mixtures thereof.

In yet another embodiment of the present invention, a composite is formed having bonded thereto a cured organopolysiloxane composition. The composition preferably contains the following components:

(A) up to 100 parts by weight of an organopolysiloxane polymer having a viscosity of about 100,000 to about 100,000,000 centipoises at 25° C. with sufficient vinyl, or mixtures of such organopolysiloxane to provide functional reactivity of a crosslinker organohydrogenpolysiloxane;

(B) from 0.3 to 40 parts by weight of an organohydrogenpolysiloxane crosslinker containing at least two silicon-bonded hydrogens per molecule;

(C) a catalytically effective amount of a platinum group metal catalyst;

(D) from 0.01 to 3 parts by weight of a cure inhibitor, preferably of the type 4 or 5, ethyl cyclohexan-1-ol;

(E) from 0.01 to 30 parts by weight of a compound comprising at least one hydroxy group and in the same molecule at least one substituent selected from the group consisting of silicon hydride, alkenyl, and acryl;

(F) from 0.01 to 10 parts of an epoxy functional compound; and (G) up to about 10 parts by weight based of a soluble polydiorganosiloxanes and polycycloorganosiloxanes (linear and cyclic) of specific molecular distribution having a viscosity of 50 to 1,000 centipoises at 25° C.

In still yet another embodiment of the present invention, a composite containing an epoxy-coated substrate having bonded thereto a cured organopolysiloxane composition is formed. The composition preferably comprises:

(A) up to 100 parts by weight of an organopolysiloxane polymer having a viscosity of about 100,000 to about 100,000,000 centipoises at 25° C. with sufficient vinyl, or mixtures of such organopolysiloxane to provide functional reactivity of the following crosslinker;

(B) from 0.3 to 4 parts by weight of an organohydrogenpolysiloxane crosslinker containing at least two silicon-bonded hydrogens per molecule;

(C) a catalytically effective amount of a platinum group metal catalyst;

(D) from 0.01 to 3 parts by weight of a cure inhibitor, preferably of the type 4 or 5, ethyl cyclohexan-1-ol;

(E) from 0.01 to 30 parts by weight of a compound comprising at least one hydroxy group and in the same molecule at least one substituent selected from a group consisting of silicon hydride, alkenyl and acryl;

(F) from 0.01 to 10 parts of an epoxy functional compound; and (G) up to about 10 parts by weight based of a soluble polydiorganosiloxanes and polycycloorganosiloxanes (linear and cyclic) of specific molecular distribution having a viscosity of 50 to 1,000 centipoises at 25° C.

In a preferred embodiment, the substrate is metal. The epoxy coating comprises chemistries used in cast, form in place, or vacuum bag cures. Moldable epoxy composites are preferable.

Preferably, a silicone soluble in the curable elastomer composition is added. In general, the silicone is less soluble in the curable elastomer composition when the curable composition has been cured. In such case, the silicone bleeds out of the cured composition. Preferably, the silicone is selected from the following or mixtures thereof:

(A) phenyl containing siloxanes such as copolymers of diphenylsiloxane with diorganosiloxanes and copolymers of methylphenylsiloxane with diorganosiloxanes, polydimethylsiloxanes, having a viscosity ranging between about 1 to about 10,000 centipoises at 25° C., preferably ranging from about 100 to about 1000 centipoises at 25° C.; and (B) fluorosiloxanes such as silicones containing trifluoropropyl substituted siloxanes, having a viscosity ranging between 100 to about 10,000 centipoises at 25° C., preferably ranging from about 100 to about 1000 centipoises at 25° C.

Examples of the foregoing include Phenyl Siloxanes commonly sold as Dow Corning 550 Fluid or GE SF-1154 and those for fluorosiloxanes FS-149, FS150-10M FS157 all of various viscosities and purity grades. These components lubricate without adversely affecting the adhesion of the composition to a substrate.

The resins to which the cured inventive composition can be bonded include nylon, polyphenylene, polyphthalamide, polyphenylene ether, polyamide and polyimid thermoplastic resins that may or may not be glass filled, mineral filled, or carbon filled. Further, thermoset resins such as epoxy, silicone or others that are manufactured by coating a substrate or by direct casting can be bonded to the cured organopolysiloxane composition in of the present invention. Preferably the resin is PBA or PBT.

Additional components may include extending fillers, coloring agents, and additives to impart increased performance with respect to certain physical properties such as oil resistance, heat aging, abrasion resistance and the like.

All such compositions have selective adhesion to polymer substrates and do not have significant adhesion to metal surfaces. The significance of selective adhesion preferably is such that the adhesion to metal in general is such that the composition sticks to a resin or epoxy coated substrate but not to metal. Preferably, the adhesion to metal is less than half the adhesion to the target polymer substrate and more preferably has no cohesion failure to the metal as determined by lap shear testing.

EXAMPLES

Curable silicone rubber compositions were prepared from a high consistency silicone rubber base. Adhesion components E through G were added in amounts shown in Table 1. Samples of these materials were made by curing the composition at 150° C. for 3 minutes. These samples were tested per ASTM D816. The results are listed in Table 1.

TABLE 1

| Run | Adhesion Components (parts by weight) | | | % cohesion Failure to listed substrate | | |
|---|---|---|---|---|---|---|
|  | F | E | G | Steel | PPA | Nylon |
| 0 | 0 | 0 | 0 | 0 | 0 | 0 |
| 1 | 0.10 | 3.00 | 1.00 | 0 | 50 | 60 |
| 2 | 0.20 | 3.00 | 1.00 | 0 | 70 | 80 |
| 3 | 0.35 | 3.00 | 0.50 | 20 | 80 | 90 |
| 4 | 0.35 | 5.00 | 1.00 | 0 | 90 | 95 |
| 5 | 0.35 | 7.00 | 1.50 | 0 | 95 | 100 |
| 6 | 0.50 | 3.00 | 1.00 | 5 | 100 | 100 |
| 7 | 0.50 | 5.00 | 1.50 | 10 | 100 | 100 |
| 8 | 0.50 | 7.00 | 1.50 | 20 | 100 | 100 |
| 9* | 0.35 | 5.00 | 1.00 | 0 | 95 | 90 |

Component E—Adhesion promoter: Hydroxyl End Blocked, polysiloxane

Component F—Epoxy functional compound: Glycidoxypropyltrimethoxysilane

Component G—Selective release additive: Trimethyl end blocked polysiloxane

9*—Had 1.0 parts by weight Polymethylphenylsiloxane as a self-lubricant

In the first example in Table 1 no adhesion promoting compounds were added to the compound as a control (Run 0). Examples Runs 1–8 show additions of adhesion promoting compounds. The last example (Run 9) shows that addition of polymethylphenylsiloxane as a lubricant does not deleteriously affect adhesion.

The examples demonstrate that improved adhesion is achieved by addition of components E and F. Specifically to this invention is that addition of component G in combination with component E and F maintains adhesion to plastic but does not adhere significantly to steel. A self-lubricating version of the optimal run 4 was replicated to show that select adhesion was unaffected. By this fact, the composition is said to be a selective adhesion promoting material with good adhesion to thermoplastics and thermosets yet not to metal surfaces and can be self lubricating.

The embodiments of the present invention recited herein are intended to be merely exemplary and those skilled in the art will be able to make numerous modifications to them without departing from the spirit of the present invention. All such modifications are intended to be within the scope of the present invention as defined by the claims appended hereto.

What is claimed is:

1. A curable organopolysiloxane polymer system having selective adhesion to a substrate, said system containing the following components:

(A) an organopolysiloxane polymer;
(B) an organohydrogenpolysiloxane crosslinker;
(C) a platinum group metal catalyst;
(D) a cure inhibitor;
(E) an adhesion promoter;
(F) an epoxy functional compound; and
(G) a trialkyl end blocked polysiloxane,
where the platinum group metal catalyst is a neutralized complex of chloroplatinic acid or platinum dichloride with symdivinyltetramethyldisiloxane.

2. A curable organopolysiloxane polymer system having selective adhesion to a substrate, said system containing the following components:

(A) an organopolysiloxane polymer;
(B) an organohydrogenpolysiloxane crosslinker;
(C) a platinum group metal catalyst;
(D) a cure inhibitor;
(E) an adhesion promoter;
(F) an epoxy functional compound; and
(G) a trialkyl end blocked polysiloxane,
where the epoxy-functional compound is glycidoxypropyltrimethoxysilane.

3. A curable organopolysiloxane polymer system, said system containing the following components:

(A) up to 100 parts by weight of an organopolysiloxane polymer having a viscosity of about 100,000 to about 100,000,000 centipoises at 25° C. with sufficient vinyl, or mixtures of such organopolysiloxane to provide functional reactivity of a crosslinker organohydrogenpolysiloxane;
(B) from 0.3 to 40 parts by weight of an organohydrogenpolysiloxane crosslinker containing at least two silicon-bonded hydrogens per molecule;
(C) a catalytically effective amount of a platinum group metal catalyst;
(D) from 0.01 to 3 parts by weight of a cure inhibitor of the type 4 or 5, ethenyl cyclohexan-1-ol;
(E) an adhesion promoter, comprising from 0.01 to 30 parts by weight of a compound comprising at least one hydroxy group and in the same molecule at least one substituent selected from a group consisting of silicon hydride, alkenyl, and acryl;
(F) from 0.01 to 10 parts of an epoxy functional compound; and
(G) a trialkyl end blocked polysiloxane comprising up to about 10 parts by weight based upon the polymer system of a soluble polydiorganosiloxanes of specific molecular distribution having viscosity of 50 to 1,000 centipoises at 25° C.

4. A composite comprising an epoxy-coated substrate having bonded thereto a cured organopolysiloxane composition, the composition comprising a curable organopolysiloxane polymer system having selective adhesion to a substrate, said system containing the following components:

(A) an organopolysiloxane polymer;
(B) an organohydrogenpolysiloxane crosslinker;
(C) a platinum group metal catalyst;
(D) a cure inhibitor;
(E) an adhesion promoter;
(F) an epoxy functional compound; and
(G) a trialkyl end blocked polysiloxane.

5. The composite of claim 4, where the substrate is metal.

6. A method of preparing a two-part polymer composition comprising:
   (i) preparing a first part by combining in any order an organopolysiloxane polymer; an organohydrogenpolysiloxane crosslinker; a platinum group metal catalyst; and a cure inhibitor and;
   (ii) preparing a second part by combining in any order an adhesion promoter; an epoxy functional compound; and a trialkyl end blocked polysiloxane.

7. The method of claim 6, wherein the resulting mixtures are combined before being introduced into an injection molding apparatus.

8. A polymer composition comprising
   (i) a first part comprising a unit of an organopolysiloxane polymer, an organohydrogenpolysiloxane crosslinker, a platinum group metal catalyst and a cure inhibitor; and
   (ii) a second Dart comprising a unit of an adhesion promoter and an epoxy functional compound and a trialkyl end blocked polysiloxane.

9. A curable organopolysiloxane polymer system having selective adhesion to a substrate, said system containing the following components:
   (A) an organopolysiloxane polymer;
   (B) an organohydrogenpolysiloxane crosslinker;
   (C) a platinum group metal catalyst;
   (D) a cure inhibitor;
   (E) an adhesion promoter;
   (F) an epoxy-functional compound, wherein the epoxy functional compound is glycidoxypropyltrimethoxysilane;
   (G) a trialkyl end-blocked polysiloxane; and
   (H) an alkoxysilane.

\* \* \* \* \*